United States Patent

Minesi

[19]

[11] Patent Number: 5,889,478
[45] Date of Patent: Mar. 30, 1999

[54] FAULT TOLERANT APPARATUS FOR DETECTING THE PASSAGE OF A MOVING BODY

[75] Inventor: Didier Minesi, Saint Fargeau Ponthierry, France

[73] Assignee: Matra Transport International, Paris, France

[21] Appl. No.: 829,661

[22] Filed: Mar. 31, 1997

[30] Foreign Application Priority Data

Apr. 1, 1996 [FR] France .................................. 9604055

[51] Int. Cl.⁶ ............................................. G08G 1/01
[52] U.S. Cl. .................. 340/933; 340/941; 340/936; 340/825.54
[58] Field of Search .................... 340/933, 936, 340/941, 825.54, 572, 573, 552, 553, 561, 445, 447, 448, 572.5

[56] References Cited

U.S. PATENT DOCUMENTS

| | | | |
|---|---|---|---|
| 4,034,367 | 7/1977 | Sugiyama et al. | 341/131 |
| 4,873,531 | 10/1989 | Heddebaut et al. | 343/711 |
| 4,912,471 | 3/1990 | Tyburski et al. | 342/42 |
| 5,023,942 | 6/1991 | Goepel | 455/601 |
| 5,123,095 | 6/1992 | Papadapolous et al. | 395/375 |
| 5,252,962 | 10/1993 | Urbas et al. | 340/870.17 |
| 5,451,941 | 9/1995 | Lamazou et al. | 340/933 |

FOREIGN PATENT DOCUMENTS

| | | |
|---|---|---|
| 92305902.5 | of 0000 | European Pat. Off. . |
| 2 098 431 | of 0000 | United Kingdom . |

*Primary Examiner*—Jeffery A. Hofsass
*Assistant Examiner*—Ashok Mannava
*Attorney, Agent, or Firm*—Robert S. Lipton; Lipton, Weinberger & Husick

[57] ABSTRACT

On the moving body, the apparatus comprises an active transponder, and on the track it comprises a passive responder. The transponder has an LF transmitter and an MF transmitter which, during displacement of the moving body, transmit to a zone through which the responder passes during said displacement. The responder has an LF receiver circuit and an MF receiver circuit having tuned radiating circuits that are associated so that an LF signal induced in the LF circuit causes the MF radiating circuit of the responder to be closed at the LF rate. The transponder responds to disturbances in the MF transmitter caused by the MF circuit of the responder being closed. The MF circuit of the responder includes two units having respective tuned radiating circuits that are strongly coupled together. Each is connected to a respective logic unit which, when excited, delivers a digital message causing the MF radiating circuit to be closed only for bits of a determined value in the digital message.

9 Claims, 2 Drawing Sheets

FAULT TOLERANT APPARATUS FOR DETECTING THE PASSAGE OF A MOVING BODY

BACKGROUND OF THE INVENTION

The present invention relates to apparatus for detecting the passage of a moving body at a determined point on its guided displacement along a track. A particularly important application of the invention lies in automatically controlled public transport installations.

Such detection apparatus is already known (EP-A-0 570 289 or U.S. Pat. No. 5,451,941) comprising an interrogation assembly carried by the moving body and designed to be connected to an electrical power supply, and a passive responder associated with the track, and in which:

the interrogator assembly has a low frequency transmitter and a medium frequency transmitter both operating continuously while the moving body is moving, each having a respective antenna emitting towards a zone which is determined relative to the antennas and through which the responder passes during displacement; and the responder comprises a low frequency signal receiver circuit and a medium frequency signal receiver circuit having respective tuned radiating circuits associated in such a manner that a low frequency signal induced in the low frequency circuit by passage through the zone causes the medium frequency radiating circuit of the responder to be closed at the rate of the low frequency, with the interrogation assembly also having means responsive to disturbances in the medium frequency transmitter caused by closing the medium frequency tuned radiating circuit of the responder when the responder is in said zone.

A public transport installation generally includes a very large number of responders distributed along its tracks and frequently referred to as "beacons". Even when maintenance is performed regularly, it is always possible that a beacon will break down. Such a breakdown is generally due to failure of an active electronic component, rather than to a break in a passive element such as a resonant circuit. Although the breakdown of one of the responders along the ordinary portions of the track is of little consequence, the same is not true of a responder situated in a station. Station responders are often used not only to detect the passage of a moving body, but also to verify that the moving body has indeed come to rest in a well-determined location, for which location the responder is in the above-mentioned zone. If a responder delivers no response when the moving body passes through a station, often the only possible solution is to omit any stop of the moving body in that station, particularly when the platforms are closed off from the track by a wall provided with doors that open only when the moving body is stationary and in a well-determined position.

SUMMARY OF THE INVENTION

An object of the present invention is to provide detection apparatus that is more tolerant than prior apparatuses to faults that can affect responders, and that is capable of delivering an indication when operation is degraded.

To this end, there is provided apparatus wherein the medium frequency circuit of the responder includes at least two assemblies having respective tuned radiating circuits that are strongly coupled together and each connected to a respective logic unit that, when excited, supplies it with a digital message and causes the medium frequency radiating circuit to be closed only for bits of a determined value in the digital message, with the digital messages being different and being transmitted asynchronously.

Such modifications to the detection apparatus described in document EP-A-0 570 289 do not merely implement redundancy by duplication. They make use of properties specific to circuits that are strongly coupled electromagnetically. In the zone "covered" by the antenna of the low frequency transmitter, the presence of a single radiating circuit tuned to said low frequency and itself short circuited has the effect of reducing the current flowing through the transmitter. It is this property which is used in the prior art apparatus. When the first low frequency resonant circuit is juxtaposed by an identical second circuit that is resonant at the same frequency and that is strongly coupled with the first, then the first circuit is almost completely masked from the low frequency transmitter in the event of both circuits being closed. It then appears as though there is no disturbing circuit in the zone. Interrupting resonance of one of the low frequency tuned circuits has the effect of unmasking the other one, and vice versa.

By controlling both low frequency tuned circuits independently and asynchronously, each during a small portion of the time, the interrogation assembly can detect the response from each of the two responder assemblies. In the event of one of the assemblies suffering a breakdown, it can still detect the passage of the passive responder in the zone. In addition, it can detect that one of the two assemblies has broken down, thus indicating that the responder needs to be repaired, but without operation being interrupted thereby.

Other features of the invention that are advantageously used in connection with the above, but that may be used independently, will appear more clearly on reading the following description of particular embodiments given as non-limiting examples. The description refers to the accompanying drawings.

DETAILED DESCRIPTION

Figure 1:
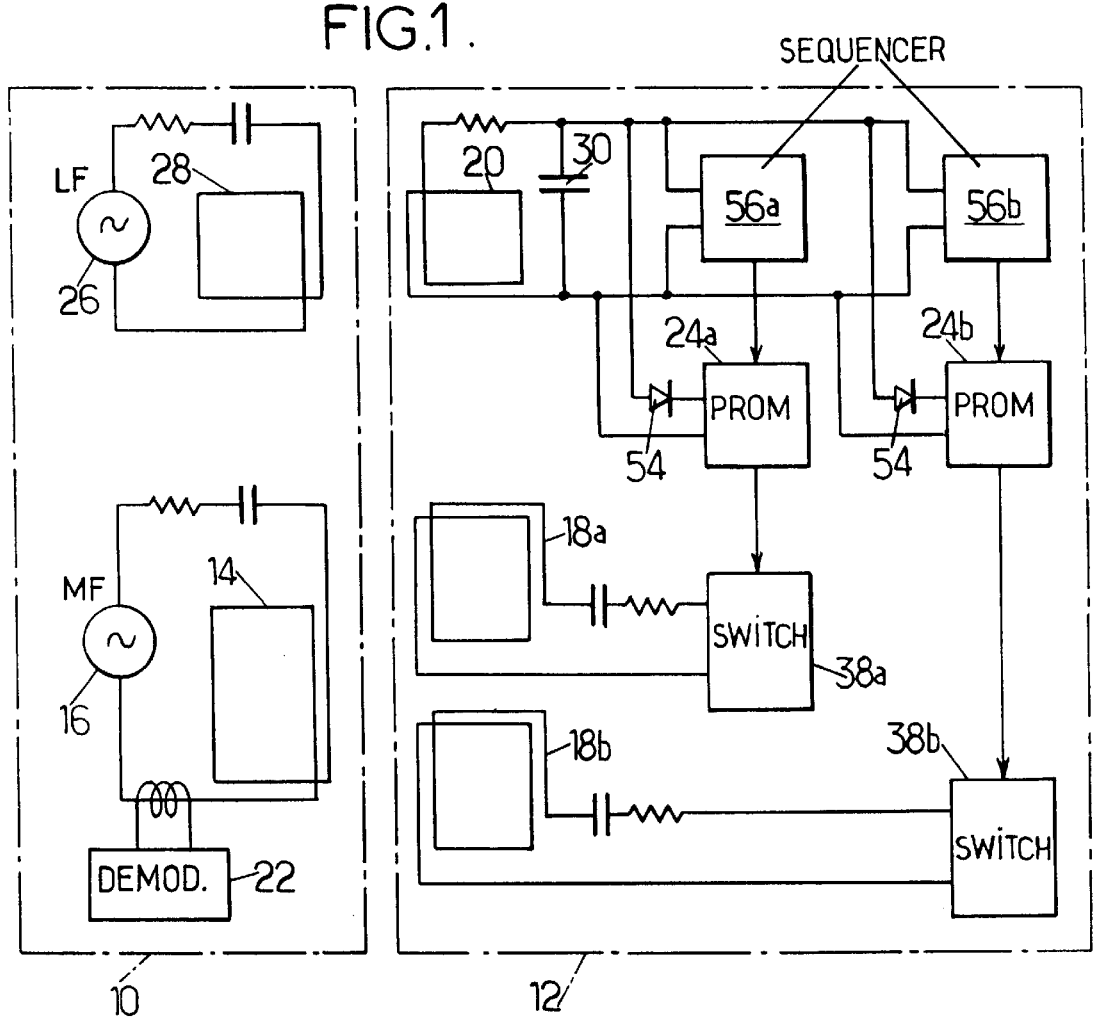
FIG. 1 is a block diagram of apparatus constituting an embodiment of the invention, with the responder comprising two assemblies.

The embodiments of the invention described below are applicable, in particular, to rail transport installations in which each responder constitutes a beacon that is fixed relative to the track.

They are particularly advantageous for a beacon situated in a station, where failure of detection detrimentally affects with operation of the installation.

The general structure of the installation and that of the interrogation assembly can be similar to the structures described in U.S. Pat. No. 5,451,941, to which reference may be made.

The interrogation assembly 10 carried by a moving body includes a medium frequency transmitter (usually a few MHz) and a low frequency transmitter (a few tens to a few hundreds of kHz). The medium frequency transmitter operates continuously and includes a generator 16 feeding an antenna resonator represented as a transmitting loop 14 in series with a capacitor and a load resistor. The structure of the low frequency transmitter is similar and comprises a plurality of tuned circuits including a generator 26 feeding an antenna resonator represented as a square loop 28 in series with a load resistor and a tuning capacitor.

The low frequency transmitter constitutes an assembly for remotely powering a receiver circuit placed in each responder and including a receiver antenna having a square loop 20 tuned to the frequency of the transmitter. The voltage which appears across the terminals of the tuning capacitor 30 due to magnetic coupling constitutes the power supply for the logic units that are intended to store information and convey it to the interrogation assembly.

The medium frequency transmitter of the interrogation assembly is coupled to a medium frequency receiver circuit placed in the responder and making use of a property of circuits having strong magnetic coupling. Whereas the apparatus described by way of example in U.S. Pat. No. 5,451,941 (Lamazou et al) makes use solely of the fact that the MF circuit of the interrogator coupling with a same-frequency resonant circuit reduces (when that resonant circuit is closed) the current which flows in the MF circuit of the interrogator, the invention makes use further of the fact that when a first resonant circuit has juxtaposed therewith a second resonant circuit which is identical and strongly coupled to the first, then the effect of the first resonant circuit is almost totally masked, and vice versa.

To make use of this property, the medium frequency receiver circuit comprises two antennas 18a and 18b that are strongly coupled to each other, and that are represented by frames, said antennas being placed so that they are coupled to the frame 14 almost simultaneously. The two antennas 18a and 18b are placed in respective identical tuned circuits, each having a respective controlled switch 38a or 38b.

Various kinds of switch can be used, depending on the value of the medium frequency, the rate at which data is to be transmitted, and the impedance of the circuit.

At certain impedance values, a field effect transistor switch suffices. A low impedance bipolar transistor, alternately put into saturated mode (on) and into blocked mode (off) can be used when the limited switching speed of such a transistor is acceptable.

In addition to a rectifier (represented by diode 54) for delivering the DC voltage required, and a common clock extractor circuit (for the low frequency clock rate), the low-frequency receiver 20 also includes two same-structure logic units, each having a respective programmable readonly memory 24a or 24b, and a respective sequencer 56a or 56b.

Each sequencer is designed to cause the corresponding readonly memory to transmit a message at intervals that are regular and spaced apart, whenever the low-frequency circuit receives power by magnetic coupling.

Figure 2:
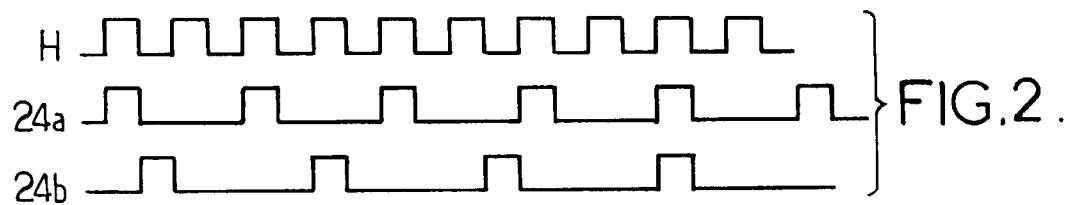
FIG. 2 is a waveform diagram showing one possible way in which the messages transmitted by the two assemblies of apparatus of the type shown in FIG. 1 can be time sequenced.

The sequencers are caused to be asynchronous so as to eliminate, or at least reduce, any risk of messages being transmitted simultaneously from both memories. They may be coupled to each other so as to offset their operation. They may also transmit several times at intervals separated by a determined number of clock periods, with the number allocated to one of the two sequencers and the number allocated to the other having no common divider which is an integer. By way of example, the messages transmitted by the two memories 24a and 24b may be staggered as shown in FIG. 2, where H is the clock signal. Each message may be binary. By using a transmission duty ratio of the order of 1/10, it is easy to transmit messages of 100 bits to 200 bits, written in an error-correcting code to improve reliability. The two messages are different so that the interrogator can determine that the responder assembly is in an operational state. The messages cause the resonant circuit to be closed or open whenever it is necessary to transmit a "1" or a "0" value bit, or vice versa. These messages are received by an amplitude demodulator 22 coupled to the medium frequency transmitter and they are applied to a decoder (not shown).

The interrogation assembly also has means responsive to disturbances in the medium frequency transmitter caused by closing the medium frequency tuned radiating circuit of the responder when the responder is in the zone.

A fault in a passive component of the responder is unlikely. In practice, breakdowns occur, if at all, in the active components. One such fault has the effect of leaving the corresponding frame 18a or 18b permanently resonant, or conversely of leaving it open circuit so that it does not resonate. In the first case, the permanently resonant frame masks the other frame when the latter is made resonant. In the second case, the faulty circuit has no effect at all. In both cases, the interrogator continues to receive the message characteristic of the circuit which is still operative, thereby enabling it to detect and identify the responder. The absence of the second message informs the interrogator that a fault has occurred.

A responder placed in a station and serving to verify that a vehicle fitted with an interrogator is stopped in a position such that the interrogator lies immediately thereover, raises an additional difficulty. It is not possible to stop the vehicle accurately over a beacon. Unfortunately, control of the automatic mechanisms often requires the interrogator to receive the message that is characteristic of the station beacon throughout the time it is stationary thereover. Receiving the characteristic message from the beacon can be a precondition for opening the doors. In another aspect of the invention, apparatus is proposed in which the responder constitutes a "long" beacon making it possible to increase the acceptable tolerance concerning the point at which the vehicle comes to rest.

Figure 3:
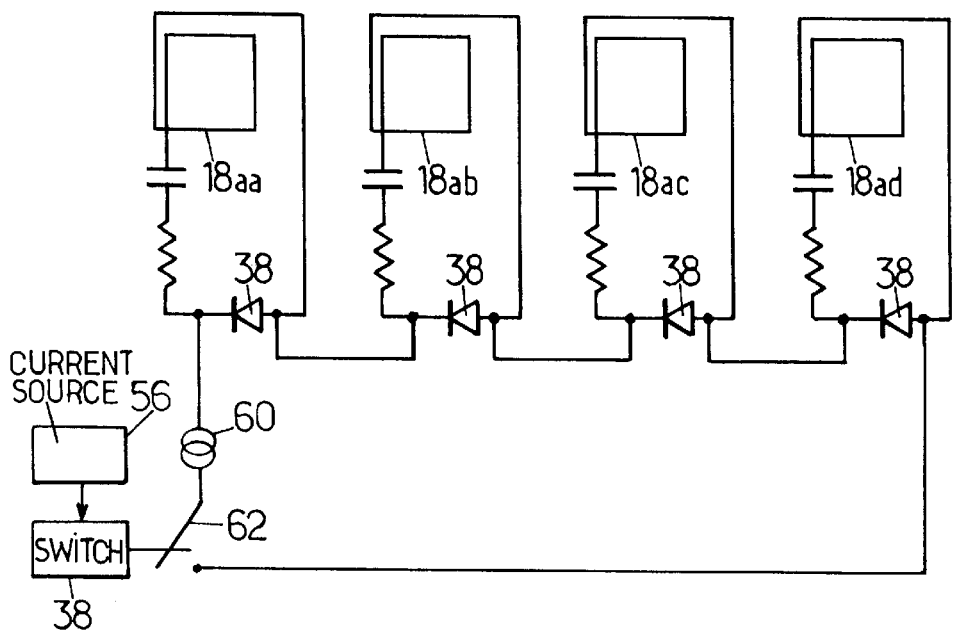
FIG. 3 is a block diagram of one possible disposition for a plurality of radiating circuits tuned to a medium frequency belonging to a responder constituting a long beacon in the travel direction.

FIG. 3 shows one possible structure for the medium frequency resonant circuit of the responder that enables a solution to be provided to the problem. The circuit 18a of FIG. 1 has been replaced by a plurality of circuits 18aa, 18ab, 18ac, and 18ad that are spaced apart in the travel direction. All of these circuits need to be driven, i.e. short circuited, in synchronous manner so that the characteristic message as transmitted is received without mutual interference, regardless of the position of the interrogator over any one of the antenna frames or astride two contiguous frames. This result is obtained by constituting a current loop in which all of the short-circuited switches are connected in series. The memory 24 is still read at the rate associated with the low frequency. The switches are advantageously constituted by diodes 38 placed in the current loop and powered from a current source 60 in the forward direction whenever the switch 62 controlled by the memory is closed.

Figure 4:
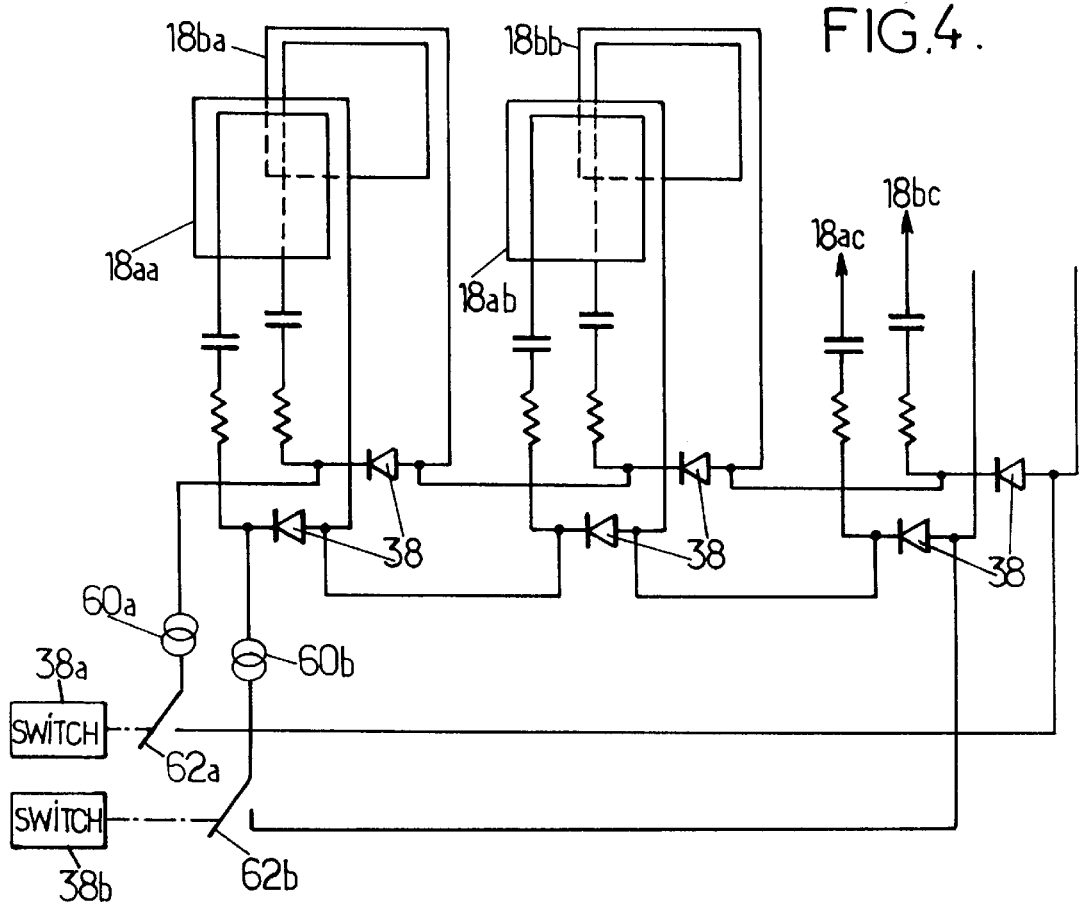
FIG. 4 is a block diagram showing a fraction of a responder constituting a long beacon and having two assemblies.

When used in a detection and redundancy apparatus of the kind shown in FIG. 1, the beacon can have the structure shown in FIG. 4, where only two pairs of frames are shown. Two current loops are then provided, one serving to close the frames 18aa, 18ab, and 18ac, while the other serves to close the frames 18ba, 18bb, and 18bc. Each loop has its own current generator 60a or 60b, and its own switch 62a or 62b. The switches must be of a type compatible with the required rate of opening and closing and with the impedance of the loop. They are generally constituted by transistors, e.g. by bipolar transistors operating so as to be alternately blocked (off) and saturated (on). Messages can be transmitted at the low frequency rate, e.g. at 128 kbits/second. The number of bits per message can be about 130, which enables each message to transmit two order (or code) numbers allocated to the beacon, and written in an error-correcting code enabling a high level of reliability to be achieved.

I claim:

1. Apparatus for detecting the passage of a moving body at a determined point in its guided displacement along a track, the apparatus comprising, on the moving body, an active interrogation assembly connectable to an electrical power supply, and on the track, a passive responder, wherein:

the interrogation assembly has a low frequency transmitter and a medium frequency transmitter that continuously operates while the moving body is moving, each having a respective antenna directed to transmit towards a predetermined zone with respect to the moving body and selected to be traversed by the responder during displacement of the moving body; and the responder comprises a low frequency signal receiver circuit and a medium frequency signal receiver circuit having respective tuned radiating circuits associated in such a manner that a low frequency signal induced in the low frequency circuit by passage through the zone causes the medium frequency radiating circuit of the responder to be closed at the rate of the low frequency, with the interrogation assembly also having means responsive to disturbances in the medium frequency transmitter caused by closing the medium frequency tuned radiating circuit of the responder when the responder is in said zone;

wherein said medium frequency circuit of the responder includes at least two assemblies having respective tuned radiating circuits that are strongly coupled together and each connected to a respective one or two logic units that arranged to deliver a digital message and causes the medium frequency radiating circuit to be closed only for bits of a determined value in the digital message, the digital messages originating from one of the logic unit being different from the digital message originating from the other and being transmitted asynchronously; and said low frequency signal receiver circuit includes a plurality of tuned radiating circuits connected in series that are spaced apart in the displacement direction of the moving body and that are provided with means for closing them simultaneously at the rate of the message originating from the associated logic unit.

2. Apparatus according to claim 1, wherein each of said logic units includes a programmable read-only memory and a sequencer energized by said low frequency receiver circuit and designed to cause delivery of the messages by the two logic units asynchronously.

3. Apparatus according to claim 2, wherein said sequencers are constructed to transmit said messages repetitively at intervals that are separated by a determined number of periods of a clock derived from the low frequency signal, the number of periods between two messages originating from one of the logic units and the number of periods between the messages originating from the second unit having no common divider which is an interrogator.

4. Apparatus according to claim 1, wherein the closure means are diodes connected in series in a common current loop also including a current generator and switch means.

5. Apparatus for detecting the passage of a moving body at a determined point in its guided displacement along a track, the apparatus comprising, on the moving body, an active interrogation assembly connectable to an electrical power supply, and, on the track, a passive responder, wherein:

the active interrogation assembly has a low frequency transmitter and a medium frequency transmitter for continuous operation while the moving body is moving, each having a respective antenna directed to transmit towards a zone which is predetermined with respect to the moving body and selected to be traversed by the responder during displacement of the moving body; and the responder comprises:

a low frequency signal receiver circuit having a circuit tuned at the low frequency, and a medium frequency receiving circuit including two assemblies having respective radiating circuits tuned at the medium frequency and strongly electromagnetically mutually coupled, each of said assemblies having a respective one of two logic units that are each arranged to deliver a respective digital message when energized and to cause the respective medium frequency radiating circuit to be closed only for bits of a determined value in the respective digital message, the digital message originating from one of the logic units being different from the digital message originating from the other of the logic units and being transmitted asynchronously therewith, wherein said low frequency signal receiver circuit is associated with said medium frequency receiving circuit and responsive to a low frequency signal induced in the low frequency receiver circuit by passage through the zone to cause each of the two logic circuits of the medium frequency receiving circuit to close the respective medium frequency radiating circuit, at the rate of the low frequency, and wherein the interrogation assembly has means responsive to closure of one of the medium frequency tuned radiating circuits of the responder when the responder is in said zone to identify said digital messages.

6. Apparatus according to claim 5, wherein the low frequency signal receiver circuit includes a plurality of tuned radiating circuits connected in series that are spaced apart in the displacement direction of the moving body and that are provided with means for closing them simultaneously at the rate of the message originating from the associated unit.

7. Apparatus according to claim 6, wherein the closure means are diodes connected in series in a common current loop also including a current generator and switch means.

8. Apparatus according to claim 5, wherein each of said logic units includes a programmable read-only memory and a sequencer energized by said low frequency receiver circuit and designed to cause delivery of the messages by the two logic units asynchronously.

9. Apparatus according to claim 8, wherein said sequencers are constructed to transmit said messages repetitively at intervals that are separated by a determined number of periods of a clock derived from the low frequency signal, the number of periods between two messages originating from one of the logic units and the number of periods between the messages originating from the second unit having no common divider which is an interrogator.

\* \* \* \* \*